Dec. 12, 1961 V. BRISING 3,012,435
APPARATUS FOR INTEGRATING MEASUREMENT OF
VARIABLE PHYSICAL QUANTITIES
OF FLOWING MEDIA
Filed July 9, 1959 8 Sheets-Sheet 1

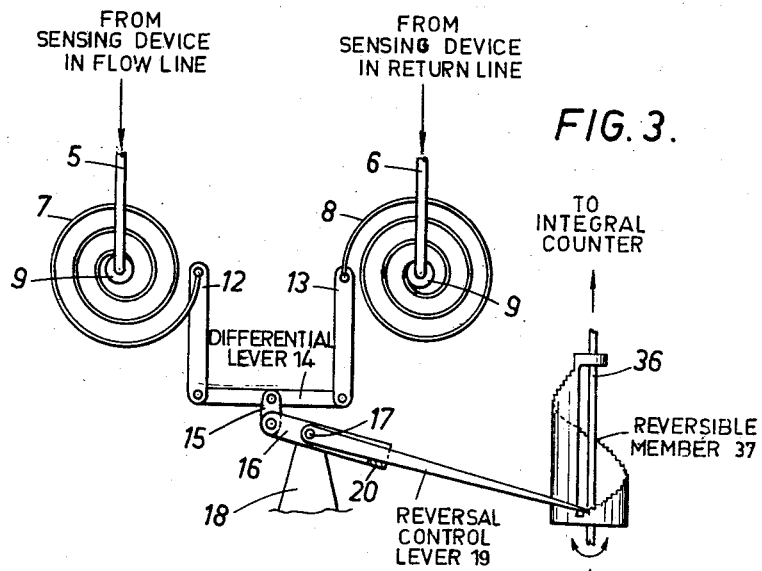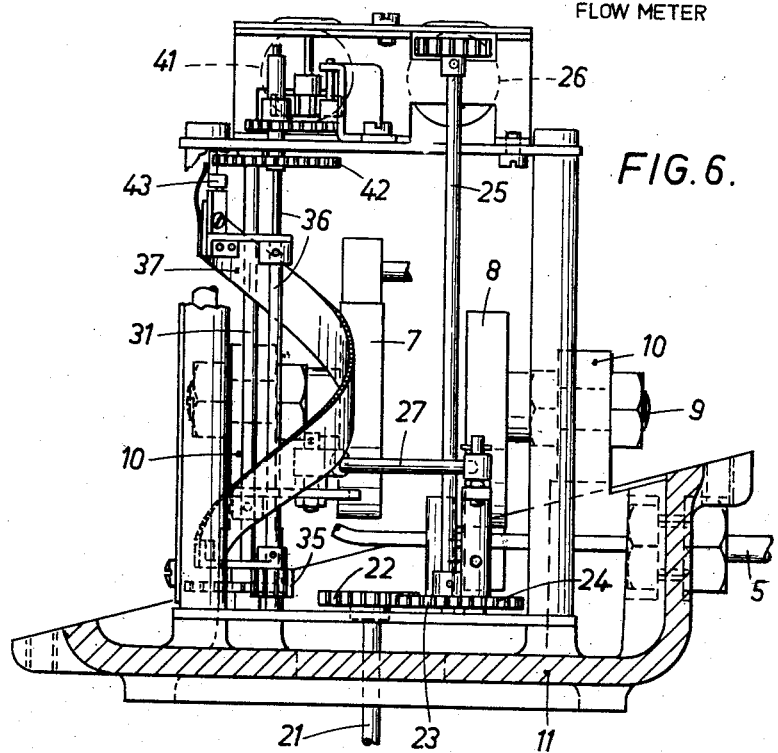

Dec. 12, 1961

V. BRISING 3,012,435

APPARATUS FOR INTEGRATING MEASUREMENT OF
VARIABLE PHYSICAL QUANTITIES
OF FLOWING MEDIA

Filed July 9, 1959

V. BRISING 3,012,435

APPARATUS FOR INTEGRATING MEASUREMENT OF
VARIABLE PHYSICAL QUANTITIES
OF FLOWING MEDIA

Filed July 9, 1959

8 Sheets-Sheet 8

United States Patent Office 3,012,435
Patented Dec. 12, 1961

3,012,435
APPARATUS FOR INTEGRATING MEASUREMENT OF VARIABLE PHYSICAL QUANTITIES OF FLOWING MEDIA
Victor Brising, Saltsjo-Duvnas, near Stockholm, Sweden, assignor to Aktiebolaget Hydrometer, Stockholm, Sweden, a Swedish joint-stock company
Filed July 9, 1959, Ser. No. 826,052
6 Claims. (Cl. 73—193)

The invention relates to an apparatus for integrating measurement of variable physical quantities of flowing media, especially heat consumption in calories or gas consumption in corrected volume reading, such integrating measurement being performed by measuring both the volume of the medium by means of a flow meter and two further variable physical quantities of the medium, each by one of two sensing devices, such as the temperatures of the flowing medium before and after heat consumption or the temperature and the pressure of the flowing medium.

The invention has been developed especially for measuring the heat consumption in apartment houses or house blocks and the like but more particularly for industrial installations, and is based on the structure of such well-known heat meters in which a driving shaft for the input axis of an integral counter (calorie counter) is rotatable forwards and backwards in dependence of the flow meter, and a differential member is jointly operated by the two sensing devices (temperature-sensing devices of the Bourdon-type or comprising bellows or the like) provided for determining the extent of the movement of the reversible driving member by means of a lever pivoted on a stationary axis. Said driving shaft operates the input axis of the integral counter over a different portion of a revolution according to the extent of its stroke and thereby also in correspondence with the difference of the quantities measured by the two temperature-sensing devices.

In the constructions of the type indicated above and hitherto generally used the temperature-sensing devices or the lever operated by the same are subjected to substantial mechanical stresses or strains caused by such parts which are operating for or during the transfer of the driving power obtained from the flow meter, so that the accuracy of the measurement is rendered unsatisfactory.

The primary object of the invention is to create, by simple mechanical means, a structure in which the sensing system is substantially relieved from mechanical stresses or strains and is rendered capable of giving a particularly exact result of measurement.

The main features of the invention are the following. The reversible driving member for the input axis of the integral counter is connected with a bar extending substantially as a helix around the axis of rotation of the same, said helical bar preferably being toothed and provided for engaging directly with said lever at different points in its movement or rotation according to the position of said lever. Moreover, said lever is, in relation to said helical bar, disposed so as to extend substantially as a tangent to the reversible helical bar at each engagement with the same for directly stopping the movement of rotation of the same and controlling the point of reversal. Thereby, said control lever is by said engagement subjected substantially only to compression strains acting in its longitudinal direction, these strains being not transferred to the differential member and the sensing system but taken up by the stationary pivot axis of said control lever.

Further objects and features of the invention will appear from the following description when read in conjunction with the accompanying drawings, in which an embodiment of a heat meter according to the invention for measuring heat consumption is illustrated by way of example.

In the drawings:

FIG. 3 is a diagrammatic view illustrating a control lever and a helical bar extending substantially as a screw line;

FIG. 6 is a vertical cross-section taken along the line VI—VI in FIG. 4;

Figure 1:
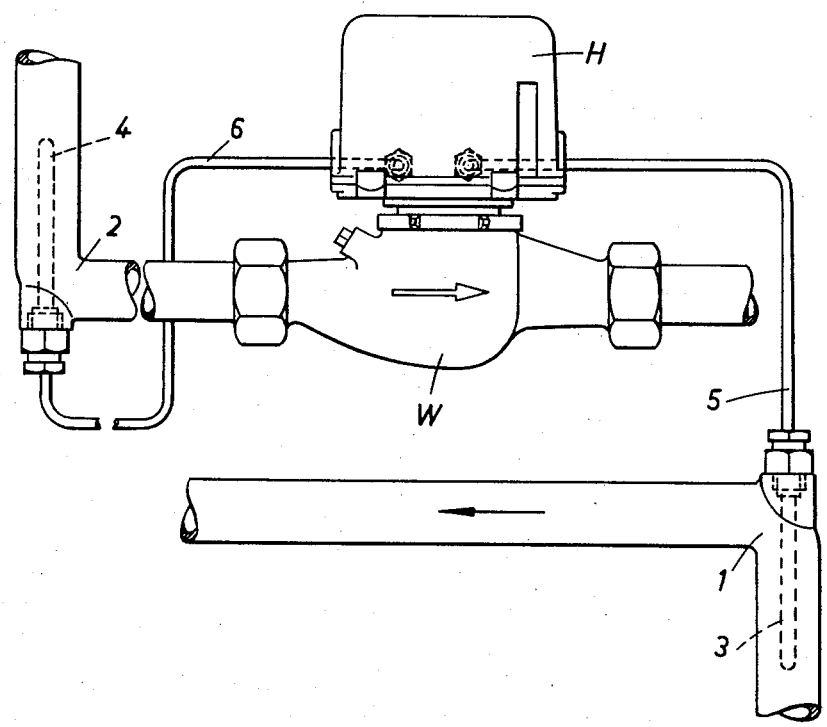
FIG. 1 is an external side view of the apparatus according to the invention together with associated parts of flow and return pipe lines.
Figure 2:
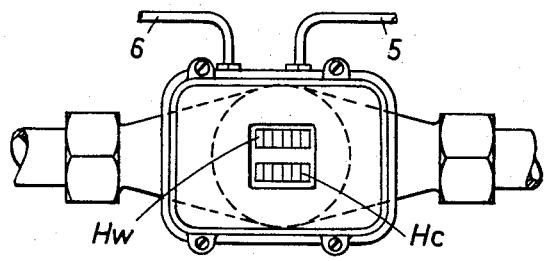
FIG. 2 is a plan corresponding substantially to FIG. 1, only some parts of the pipe lines being omitted.
Figure 4:
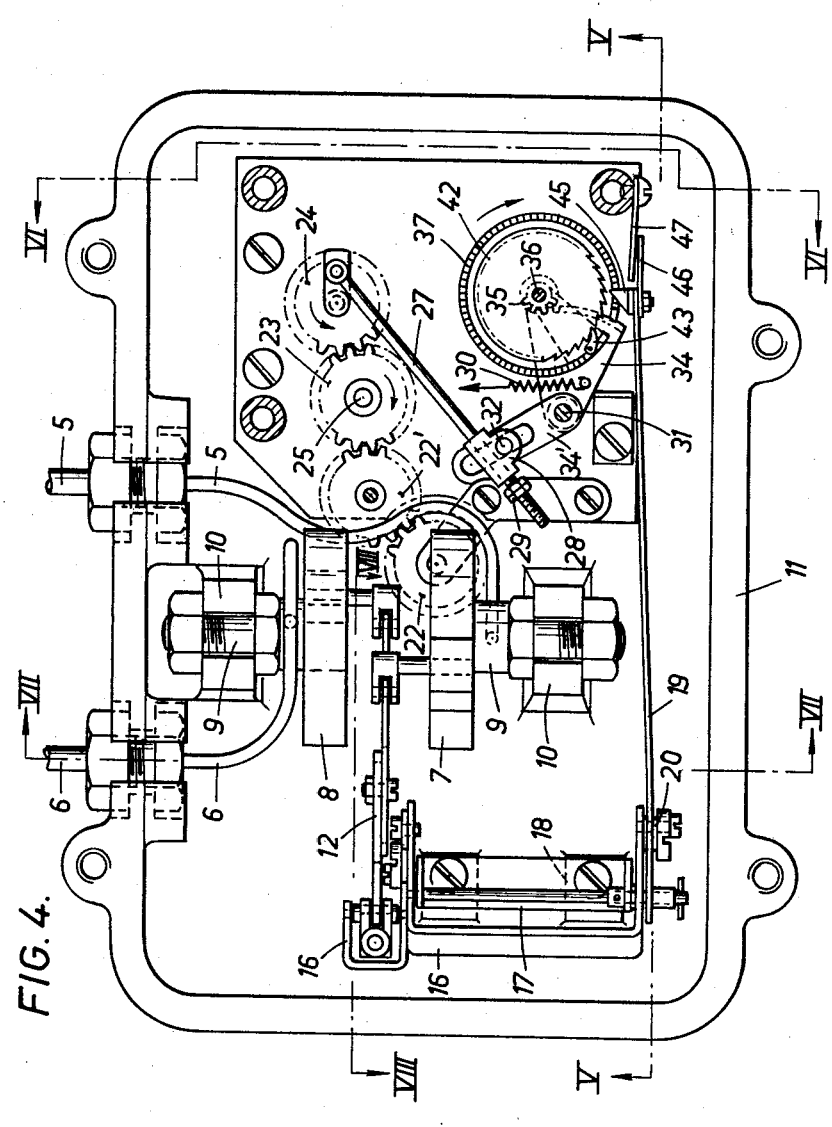
FIG. 4 is a plan of the measuring apparatus proper, the cover of the same together with some upper parts being omitted for showing the internal mechanism.
Figure 8:
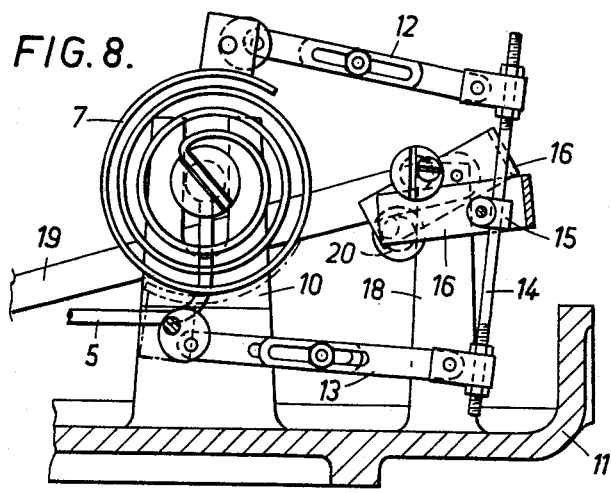
FIG. 8 is a fractional vertical cross-section taken along the line VIII—VIII in FIG. 4.

In the drawings, especially FIG. 1, the reference numerals 1 and 2 indicate the two pipe line conduits of a heat consumption circuit, viz. 1 the forward conduit or flow pipe line for hot water and 2 the return conduit or return pipe line for the water after having delivered heat to heat consuming units (not shown). The reference numerals 3 and 4 indicate well-known temperature-sensing devices (thermometers) disposed in the flow conduit and in the return conduit, respectively, which sensing devices through capillary tubes 5 and 6, respectively are connected with individual Bourdon tubes 7 and 8, respectively; see also FIGS. 3, 4 and 8, for example. The return conduit 2 includes a water flow meter W of any suitable type, for instance the helical wheel type or the Woltman type. The casing of the water meter supports the apparatus H according to the present invention and drives two counters in the same. The counters are indicated by H$w$ and H$c$ in FIG. 2, the counter H$w$ registering the quantity of hot water, for instance in cubic meters or cubic feet, and the counter H$c$ registering the quantity of heat, for instance number of kilogramme calories or other thermal units. The counter H$w$ is driven directly, but the counter H$c$ which is the integral counter is driven over the reversible helical member under the control of the differential system as shown diagrammatically in FIG. 3. The gearing for transferring the movement from the water meter will be described later.

The general arrangement of the main constituents of the apparatus according to the invention will appear from FIG. 3, and the detailed construction is illustrated in FIGS. 4 to 8. The inner ends of the Bourdon tubes 7, 8, which communicate with the capillary tubes 5, 6, are supported by bolts 9 screwed to brackets 10 mounted stationarily on a bottom frame or base 11 of the apparatus. The closed outer end of the Bourdon tubes are by individual links 12 and 13, respectively, pivotally connected with the respective one of the two ends of the differential lever 14. This lever is at an intermediate point pivotally connected by the link 15 to one end of a double-armed lever 16 which is pivotally mounted on a horizontal axis 17 supported in a bracket 18. On the stationary pivot 17 also the control lever 19 is pivoted for rocking movement up and down. The double-armed lever 16 is provided with a projection 20 engaging below the control lever 19, and serves as a lifting arm for the control lever 19. It should be understood that the lifting arm 16 will raise the control lever 19 to a different height according to the value of the difference of the temperatures in the two conduits 1, 2 and thus according to the setting of the parts 12, 13, 14, effected by the Bourdon tubes, but the lifting arm 16 will not positively drive the control lever 19 when moving downwards.

Figure 5:
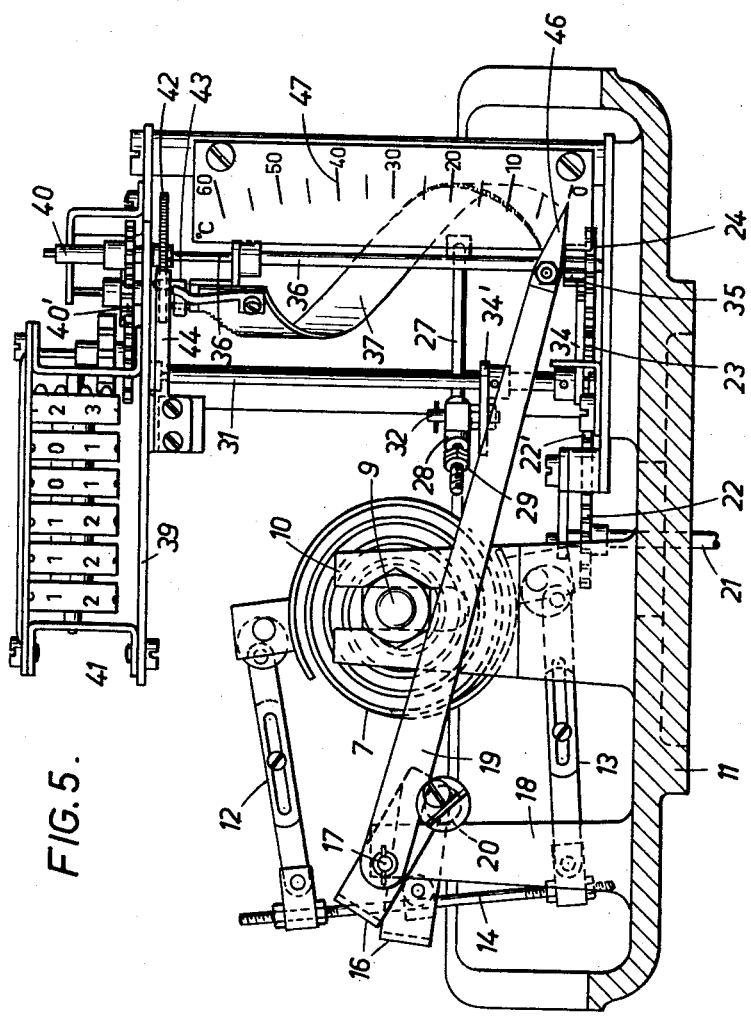
FIG. 5 is an elevation corresponding substantially to FIG. 4 and taken along the line V—V in FIG. 4, the cover being omitted.
Figure 7:
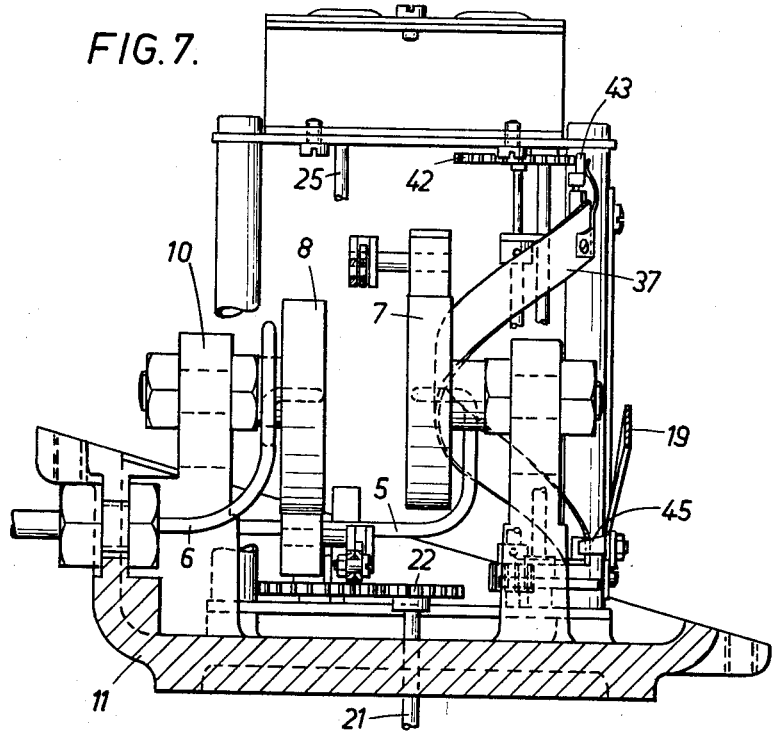
FIG. 7 is a vertical cross-section taken along the line VII—VII in FIG. 4.

The driven output axis of the water meter is indicated at 21, FIGS. 5, 6 and 7. The axis 21 serves as the driving axis for the apparatus according to the invention and supports a toothed wheel 22 above the base 11. Said toothed wheel operates through an intermediate wheel 22' two further toothed wheels 23 and 24. The wheel 23 is supported by the input axis 25 of the counter 26 for the water volume (counter Hw). The wheel 24 operates a connecting rod 27 back and forth. On said rod a sliding head 28 is mounted, which supports a pin 32 which is in engagement with a slot provided in an arm 34' fixed on an axis 31 supporting also a toothed segment 34 which is thereby rotated back and forth. A spring 30 connected between the toothed segment 34 and a stationary part, tends to rotate said segment counter-clockwise in FIG. 4 and thereby to hold the sliding head 28 yieldingly against an abutment 29 fixed on the rod 27. The toothed segment 34 meshes with a toothed wheel 35 which is secured on a vertical axis 36 which consequently is also rotated back and forth. The axis 36 supports the helical bar 37 already mentioned, which in the embodiment shown extends substantially along a screw line extending nearly over one revolution. Said helical bar could be formed of the helically extending edge of a sleeve of a cylindrical cross-section, as indicated in FIG. 3, but is preferably formed of a separate strip, as shown in FIGS. 4 to 7. The parts 35, 36, 37 form together a reversible unit which is rotatable forwards and backwards over a portion of one revolution.

In the top frame 39 the input or entry axis 40 of the integral counter 41 for quantity of heat (the calorie counter Hc) is rotatably mounted, said axis 40 actuating the counter over a gearing 40'. In the lower end portion of the input axis 40 said driving axis 36 has its upper end rotatively mounted. Below the top frame 39 the input axis 40 supports a ratchet wheel 42, and with this wheel a spring-pressed pawl 43 cooperates, which is mounted on the helical bar 37. During rotative movement of the reversible member 36, 37 forwards to the point of reversal (in clockwise direction in FIG. 4) the pawl 43 slides over the circumference of the ratchet wheel 42 without driving the same. For holding the ratchet wheel 42 together with the input axis 40 immovable during said forward movement a spring catch 44 (FIG. 5) is provided, said catch being mounted on the top frame 39. During the return movement of the reversible member 36, 37 from the point of reversal (in counter-clockwise direction) the ratchet wheel 42 is driven by the pawls 43, while the spring catch 44 slides over the circumference of the ratchet wheel 42 without preventing the rotation of the same. Thus, during said return movement an entry is made in the calorie counter 41. It should be understood that, after the member 36, 37 has arrived at its point of reversal, which is a stop position, the connecting rod 27 performs the remaining part of its forward movement without driving the toothed segment 34 with the member 36, 37, and that the connecting rod 27 upon arriving at its own point of reversal performs the initial part of its return movement to the point of reversal of the member 36, 37 as a pure idle motion, said member being driven under the action of the connecting rod only beyond the last-metioned point of reversal.

Figure 9C:
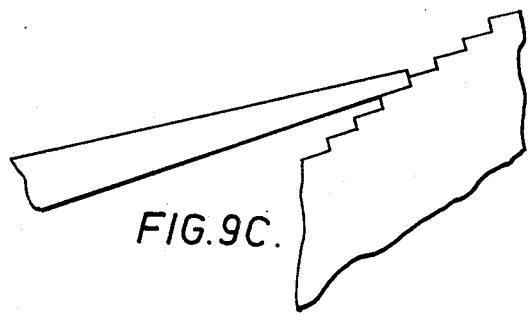
FIGS. 9A, 9B and 9C illustrate on a greater scale the engagement of the toothed helical bar with the control lever in different positions.
Figure 9B:
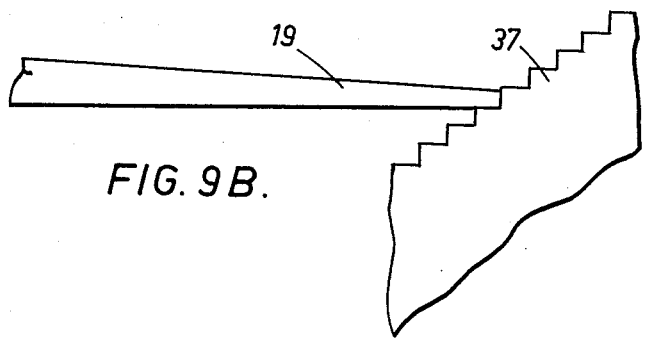
Figure 9A:
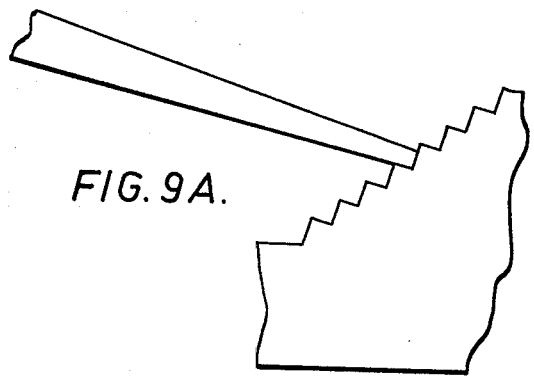
Figure 12:
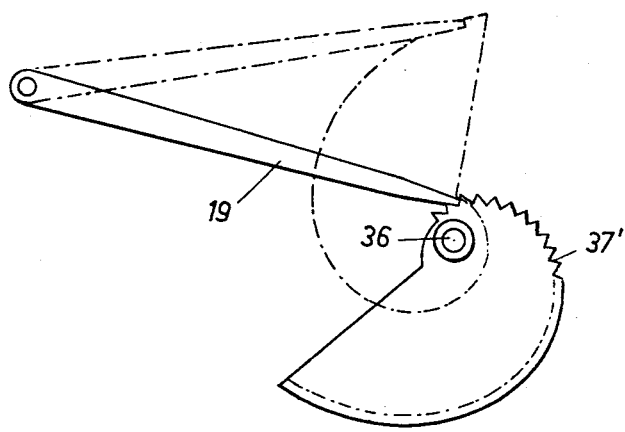
FIG. 12 illustrates a control lever and a helical bar extending as a flat helix instead of a screw line helix.
Figure 10:
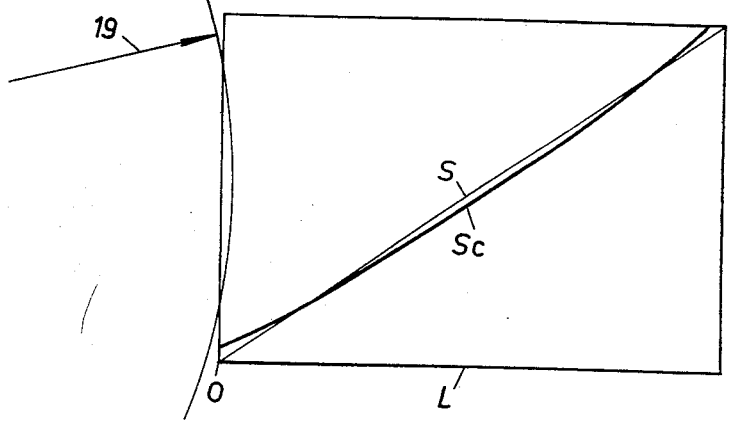
FIG. 10 illustrates the way of correcting the helical shape of the helical bar in view of the arc-shaped path of movement of the point of the control lever.

As already mentioned, the point of reversal of the member 36, 37 is determined by the control lever 19. This lever is disposed substantially as a tangent to the cylindrical envelope surface of the helical bar 37 and is provided with a lateral projection or stop 45 for co-operation with the teeth of said bar which is toothed or stepped for facilitating the engagement of the end of control lever 19 which is shown in FIGS. 9 and 12 as forming the stop or with the projection 45. The steps made on the helical bar may have a varying inclination for corresponding to the varying inclination of the control lever 19 in different positions of setting, as shown in FIGS. 9A, 9B and 9C. The control lever 19 may be provided with a pointer 46 for co-operation with a scale 47 of temperature degrees. As the lateral projection 45 does not move in a straight vertical path but along an arc of a circle, the bar or edge 37 should not be an exact screw line, small deviations from an exact screw line being required for compensating the arc-shape of the path of the projection 45. This is illustrated in FIG. 10, where S is an unfolded true screw line and L indicates the length of the circumference over which the screw line extends from the point O. By Sc is indicated the actual screw line corrected by subtracting or adding the amounts by which the arc-shaped path of the engagement point of the control lever 19 deviates from the vertical axis extending from the point O. Evidently, the amount of the necessary correction is reduced when said path extends only in its middle part to the right of said vertical axis.

The position of the point of reversal of the member 36, 37 during the rotary movement is dependent on the vertical position of the control lever 19, the vertical position of this lever being dependent on the two Bourdon tubes 7, 8 and the difference of the temperatures in the conduits 1, 2. At small differences of temperature the control lever 19 occupies a low position, the engagement between the projection 45 and the helical bar 37 taking place at an early point of time during the forward movement of the member 36, 37. At great differences of temperature the control lever 19 occupies a high position, the engagement between the projection 45 and the helical bar 37 taking place at a later point of time during the forward movement of the member 36, 37. When said engagement takes place the rotary movement of the member 36, 37 is stopped for the remaining part of the forward movement of the toothed segment 34, said remaining movement being possible on account of the sliding connection between the segment 34 and the rod 27. On account of the yielding transmission between segment 34 and rod 27 also the driving axis 21 and thereby the input axis 25 of the flow meter will continue their rotary movement.

Thus, the extension of the return movement of the member 36, 37, during which return movement the entry in the calorie counter 41 takes place, will vary with the location of the point of reversal of said member within the revolution and is determined by the vertical position of the control lever 19, but the helical bar does not have any influence on the setting of the control lever 19. Certainly, the member 36, 37 will subject the control lever 19 to certain mechanical strains when engaging with the projection 45, but these strains will act in the longitudinal direction of the control lever 19 and are taken up entirely by the pivot 17 and the bracket 18 but are not transferred to the Bourdon tubes 7, 8, nor to the means 12, 13, 14. During the intervals in which there is no engagement between the projection 45 and the helical bar 37, the control lever 19 is quite free for occupying any position of setting, and the Bourdon system has only to take up the quite low weight of the control lever 19. Evidently, a great accuracy of measurement is thereby secured.

It should also be observed, that during increasing temperature the helical bar 37 will not prevent the continued lifting of the control lever 19 under the action of the lifting arm 16. Certainly, during decreasing temperature and forward movement of the member 36, 37 the helical bar 37 will prevent the control lever 19 from moving downwards under the action of its own weight, but the lifting arm 16 will at decreasing temperature allow a free movement of the differential lever 14. In other words, the provision of the lifting arm 16 has the effect that a lost motion is introduced between the levers 14 and 19 at decreasing temperature.

Figure 11:
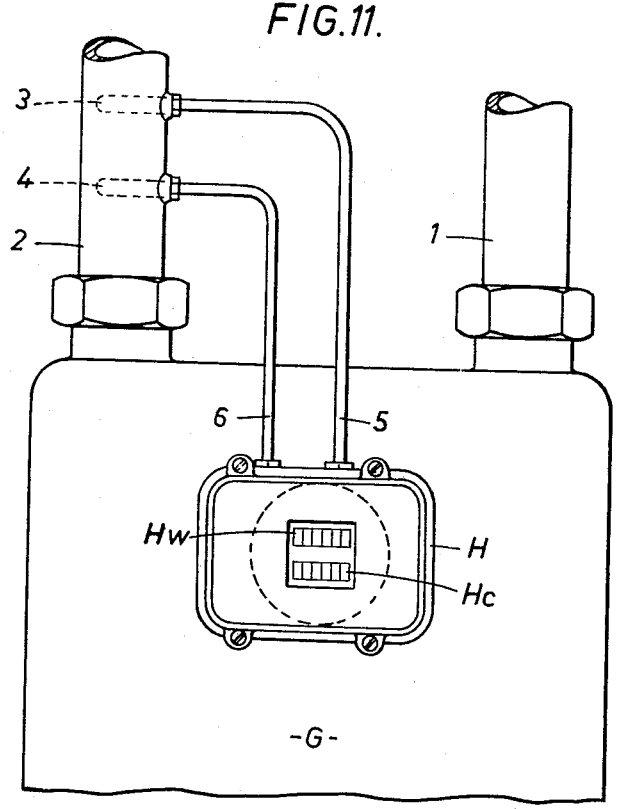
FIG. 11 illustrates the connection of the apparatus according to the invention to a gas meter instead of a water flow meter.

The apparatus described above and illustrated in the drawings can be utilized also in connection with gas meters for translating the uncorrected volume reading of the gas meter to a corrected volume for billing, as illustrated in FIG. 11 of the drawings. In such a case, a gas meter G will take the place of the water flow meter W the gas meter being connected between the two conduits 1 and 2 as shown, said conduits then representing the gas pipe line. The two sensing devices 3 and 4 should be disposed behind each other in one and the same conduit 2 before the gas meter, one sensing device 3 responding to the pressure, while the other sensing device 4 still responds to the temperature. The driven output axis of the gas meter corresponds to the axis 21 shown in the drawing. The integral counter Hc will indicate the corrected gas volume, whereas the counter Hw will show the uncorrected reading of the gas meter.

Instead of a helical bar extending as a screw line, a bar extending as a flat helix could be used for the engagement with the control lever. This is illustrated in FIG. 11 where the flat helix is indicated at 37′, while 36 still is the reversible axis and 19 is the control lever. That the control lever is not subjected to substantial bending stresses is important, as well as that the Bourdon system need not take up a greater load than that corresponding substantially to the unbalanced weight of said lever during the free setting movement of the same.

It should be understood that the invention is not restricted to the embodiment illustrated in the drawings and described above, many modifications being possible without departing from the principal features of the invention as claimed.

What I claim is:

1. An apparatus for accurately measuring the heat given up by fluid passing through a heat exchange system having variable input and return conditions of the fluid, said apparatus comprising a flow responsive means for sensing flow regardless of the variable conditions, a first shaft rotated by said sensing means in one direction only, the rotations of said first shaft being directly proportional to the volume of fluid passing through said flow responsive means, mechanical means to convert rotary motion of said first shaft into oscillating motion and including lost motion means, a second shaft driven with an oscillating motion from said first shaft by said mechanical means, a register driven by said second shaft as it oscillates in one direction, two separate temperature sensing means located in the flow of said fluid, each to sense one of two variable temperature conditions of said fluid in and out of said heat exchange system, differential means operated by said two separate temperature sensing means, a stationary pivot, an arm mounted for pivotal movement on said pivot adapted to swing between two extreme positions, stop means carried by said arm, said differential means being operatively connected to said arm to give a pivotal movement of said arm proportional to the differential of the conditions sensed by said temperature sensing means whereby said stop means is located along an arc in a fixed plane in a position proportional to said variable conditions, an element mounted on and oscillated by said second shaft provided with teeth along one edge, the teeth on said element being arranged to be presented successively on said arc described by said stop as said oscillating element turns toward said stop, each said tooth being positioned on said oscillating element to limit the oscillation of said element by contacting said stop when said stop is located by said differential means in the path of said tooth as it oscillates, the position of each tooth with relation to said second shaft being such that when it engages said stop the oscillation of said second shaft is limited to an angle proportional to the differential of said variable temperature conditions so that said register is driven by said volume-of-flow measuring device at a rate modified by the differential of the variations of said variable temperature conditions whereby the register may be calibrated in units consistent with the sensed conditions.

2. An apparatus for accurately measuring the volumetric flow through a pipe or the like of a gas or the like corrected for variable conditions such as temperature and pressure, comprising a volume-of-flow sensing device to sense the volumetric flow regardless of the variable conditions, a first shaft rotated by said volume-of-flow sensing means in one direction only, the rotations of said first shaft being directly proportional to the volume of fluid passing through said volume-of-flow sensing device, mechanical means to convert rotary motion of said first shaft into oscillating motion and including lost motion means, a second shaft driven with an oscillating motion from said first shaft by said mechanical means, a register driven by said second shaft as it oscillates in one direction, two separate variable condition sensing means located in the flow of said fluid, each to sense one of the two variable conditions of said fluid being measured, differential means operated by said two separate variable condition sensing means, a stationary pivot, an arm mounted for pivotal movement on said pivot adapted to swing between two extreme positions, stop means carried by said arm, said differential means being operatively connected to said arm to give a pivotal movement of said arm proportional to the differential of the variable conditions sensed by said variable condition sensing means whereby said stop means is located along an arc in a fixed plane in a position proportional to said variable conditions, an oscillating element mounted on and oscillated by said second shaft provided with teeth along one edge, the teeth on said oscillating element being arranged to be presented successively on said arc described by said stop as said oscillating element turns toward said stop, each said tooth being positioned on said oscillating element to limit the oscillation of said element by contacting said stop when said stop is located by said differential means in the path of said tooth as it oscillates, the position of each tooth with relation to said second shaft being such that when it engages said stop the oscillation of said second shaft is limited to an angle proportional to the differential of said variable conditions so that said register is driven by said volume-of-flow sensing device at a rate modified by the differential of the variations of said variable conditions whereby the register may be calibrated in units consistent with the sensed variable conditions.

3. The apparatus of claim 2, in which the plane of the arc of movement of said stop is vertical and said arm is of two parts including a first part mounted directly on said pivot, and a second part pivoted on said first part for swinging movement in the same plane as said first part, and abutment means on said first part to limit downward movement of said second part with respect to said first part.

4. The apparatus of claim 3, in which said abutment means is vertically adjustable to provide adjustment of the position of said stop means with respect to said pivot along said arc.

5. The apparatus of claim 3, in which said toothed oscillating element is in the form of a helical bar, the plane of said arc of movement of said stop being tangential to the helix defined by said helical bar.

6. The apparatus of claim 3, in which the direction of oscillation of said oscillating element is limited by engagement between said stop and a tooth on said oscillating element in the opposite direction to the one direction of movement of the oscillating shaft that drives said register.

References Cited in the file of this patent

UNITED STATES PATENTS

| | | |
|---|---|---|
| 1,476,576 | Armstrong et al. | Dec. 4, 1923 |
| 2,123,978 | Wagner | July 19, 1938 |
| 2,667,783 | Mijnlieff et al. | Feb. 2, 1954 |

FOREIGN PATENTS

| | | |
|---|---|---|
| 43,651 | Sweden | Dec. 2, 1915 |